United States Patent
Johnson

[15] 3,664,145
[45] May 23, 1972

[54] VACUUM-FREEZING, EJECTOR ABSORPTION SOLUTION SEPARATION SYSTEMS AND METHODS

[72] Inventor: Wallace E. Johnson, 1116 Olympian Boulevard, Beloit, Wis. 53511

[22] Filed: Oct. 13, 1969

[21] Appl. No.: 865,834

[52] U.S. Cl. ................................................62/58, 62/123
[51] Int. Cl. ...........................................................B01d 9/04
[58] Field of Search ...................................62/58, 123, 124

[56] References Cited

UNITED STATES PATENTS

| | | | |
|---|---|---|---|
| 3,070,969 | 1/1963 | Ashley et al. | 62/124 |
| 3,259,181 | 7/1966 | Ashley et al. | 62/123 |
| 3,501,924 | 3/1970 | Ashley et al. | 62/123 |

Primary Examiner—Norman Yudkoff
Assistant Examiner—Sam Silverberg
Attorney—Petherbridge, O'Neill & Lindgren

[57] ABSTRACT

There is disclosed herein novel systems and methods for separating a solvent in substantially pure form from a solution including freezer means for producing vapors and a slurry of solvent and solute, means for separating a frozen solvent and liquid solute, ejector means for moving the major portion of the solvent vapor from the freezer means, bypass means for increasing the temperature and pressure of the remaining portion of the solvent vapor produced in the freezer means and means for bypassing the remaining portion of the solvent vapors from the freezer means to the bypass means.

20 Claims, 2 Drawing Figures

VACUUM-FREEZING, EJECTOR ABSORPTION SOLUTION SEPARATION SYSTEMS AND METHODS

This invention is directed to systems, methods and apparatus for separating solvent, in substantially pure form from solutions and/or producing a concentration of the remaining solution, and is more particularly directed to systems, methods and apparatus for producing "sweet" water from sea water, brackish water and the like employing freezing means to produce solvent vapor, ejector means for moving and compressing the vapor, and absorber loop means for by-passing a portion of the vapor from the freezer means, means for increasing the temperature and pressure of the by-passed vapor and moving the by-passed vapor to the ejector means to provide the motive force to move the major portion of the vapor from the freezing means and through the ejector means.

Among the most pressing problems in the world is the lack of fresh water, especially in areas which are bounded by substantial bodies of salt water, which due to its salinity, is unfit for human consumption or for irrigation. Hence, the problem of converting unpotable water, such as sea water, to potable water has assumed great importance.

There have been numerous systems proposed for desalinating sea or brackish water, or producing potable water from salt water, and several methods and/or systems have been actually developed for this purpose but with varying degrees of success. The principal difficulties inherent in the current systems so far developed have been the lack of the ability to meet the volume requirements and production economics. For, not only must a desalination system be able to produce large volumes of potable water, but the cost must be kept at an economical level, especially in view of the fact that a majority of the areas of the world in which the water shortage problem is most acute have among the lowest gross national products in the world.

Among the most successful systems developed for desalination is the vacuum-freezing type of system wherein, generally, the salt water is flash-frozen to produce water vapor and a slurry of ice and brine, the vapor is separated from the slurry, the slurry is washed, and the substantially pure ice is separated from the brine slurry and the vapor is condensed. However, even this type of system has limitations in that the apparatus presently employed has been unable to handle purification of large volumes economically.

Generally, the flash freezing systems employ a freezer apparatus into which deaerated sea water is introduced, and in which the brine solution is frozen to produce water vapor and a slurry of ice crystals and brine. The water vapor is continuously removed from the freezer unit by means of a mechanical compressor and condensed in order to produce product water while the ice-brine slurry is also continuously removed from the freezer unit. The ice is washed and melted to produce additional quantities of product water. A particularly successful vacuum freezing, vapor compression system is taught in U.S. Pat. No. 3,255,603 assigned to the assignee of the present invention.

The principal difficulty encountered with the vacuum freezing type system described above is that the amount of product water which can presently be produced is directly dependent upon the size and efficiency of the mechanical compressor used. Furthermore, in some cases, mechanical compressors are subject to scaling, corrosion and mechanical failure due to the effects of the salt content of the solution, thereby adversely affecting the efficiency of the system as a whole.

Therefore, it is an object of the present invention to provide new and improved methods, systems and apparatus for separating a solvent in substantially pure form from a solution.

It is another object of this invention to provide new and improved systems and methods, and apparatus for the desalination of sea water or brackish water which eliminates the necessity for the use of mechanical compressor units for moving water vapor from the vapor producing unit in order to produce product sweet water.

Another object of the present invention is to provide systems, methods and apparatus utilizing a new and novel ejector unit to compress and move vapor through the system.

Still another object of this invention is to provide new and improved systems, methods and apparatus for the desalination of sea or brackish water wherein water vapor generated within the system (i.e., steam) is utilized as a means for moving water vapor through the system.

A further object of this invention is to provide a new and improved system, methods and apparatus for the desalination of sea or brackish water which can produce large quantities of product sweet water economically as compared to the cost of the energy input requirements of the system and apparatus.

A still further object of this invention is to provide a system for the desalination of sea or brackish water which has a substantially unlimited end product volume range.

Still another object of this invention is to provide new and improved separation systems, methods and apparatus in which vapor is produced, compressed, and moved efficiently through the system, methods and apparatus without the necessity of mechanical compressors.

A further object of this invention is to provide a system, methods and apparatus of the type set forth herein which minimizes corrosion, scale and mechanical failure of the apparatus.

A still further object of this invention is to provide a new and novel continuous freezing ejector-absorption systems, methods and apparatus which are economical in cost and efficient in operation for the desalination of sea or brackish water which includes freezer means for producing vapor and an ice brine slurry, ejector means for moving and compressing the vapor in lieu of mechanical compressors, washer-melter means for washing the ice and separating the washed ice from the brine in order to produce substantially pure product sweet water, means for by-passing a minimum portion of the vapor from the vapor producing means to absorber-regenerator means for increasing the temperature and pressure of the vapor, means for introducing the vapor into the ejector means, means for utilizing the vapor to provide the driving force for moving the major portion of the vapor through the ejector means to washer-melter means for heat exchange with said washed and separated ice to condense the vapor and to melt the ice whereby the by-passed vapor is also eventually utilized to produce product sweet water.

Still another object of this invention is to provide a new and improved continuous, freezing, ejector-absorption separation system for separating a solvent in substantially pure form from a solution, including freezer means maintained under pressure conditions sufficient to cause formation of vapor and a slurry of frozen solvent and having inlet means for introduction of solution therein, ejector means in fluid communication with the freezer means for maintaining the pressure conditions in the freezer means and for moving and compressing the major portion of vapor from the freezer means, absorber means in fluid communication with the freezer means for receiving and absorbing a portion of the vapor produced in the freezer means, washer-melter means in fluid communication with the freezer means for receiving the frozen portions of the solution from the freezer means for separation into its component parts, the ejector means being also in fluid communication with the washer-melter means whereby the combined major and minor portions of vapor are delivered to the washer-melter means for melting and condensing of the vapor frozen solvent thereby to separate the same into its component parts, and regenerator means in fluid communication with the absorber means for regenerating the absorbed vapors to effect separation of additional portions of the solvent, the regenerator means being also in fluid communication with the ejector means whereby additional portions of vapor are delivered to the ejector means for driving the same, whereby the solvent to be separated enters the system through the inlet means into the freezer means wherein portions thereof are frozen to form a frozen solvent slurry, which is then delivered to the washer-melter means to form a frozen solvent column therein, while other portions of the vapor are delivered from the freezer means to the absorber means and absorbed therein and then delivered to the regenerator means wherein the absorbed vapor is regenerated to form higher temperature and pressure product solvent vapor and the higher temperature and pressure vapor is then delivered to the ejector means to drive the ejector means and thereby move and compress the vapor portion of the vapor before it is delivered to the washer melter means thereby to melt washed frozen solvent and condense the vapor.

Further objects, advantages and features of the present invention pertaining to the particular arrangement of the system and apparatus and of the steps of the method of the present invention, both as to its organization and method of operation, together with further objects and advantages thereof, will best be understood by reference to the following specification taken in connection with the accompanying drawing in which FIG. 1 is a schematic illustration of one embodiment of the system and apparatus and, FIG. 2 is a schematic of one preferred embodiment of the system and apparatus whereby the above-outlined methods, objects, features and advantages of the present invention may be attained.

DESCRIPTION OF INVENTION

Briefly described, the system, method and apparatus of the present invention illustrated in the drawing in their application as a desalination system shows sea water entering the system through a deaerator wherein the dissolved air contained therein is reduced to a low level. From the deaerator, the sea water is then pumped through a heat exchanger wherein the sea water is cooled to freezer means with both the outgoing brine and product sweet water.

Part of the sea water is evaporated within the freezer means resulting in the production of vapor and an ice-brine slurry mixture.

The concentrated ice and brine slurry mixture then flows, as by gravity, to washer-melter means where an ice piston bed column is formed in the washer and brine is continuously extracted from the ice bed through drain tubes suitably provided. In the interim, the major portion of the vapor evolved in the freezer means is removed therefrom and is compressed by ejector means and the compressed vapor is then delivered to the ice column in the melter portion of the washer-melter means. The vapor condenses on the washed ice and melts the ice resulting in potable water. The bulk of the product water thus formed flows along the top surface of the ice column and cascades to drainage troughs from which the product water is removed and delivered from the system through said heat exchanger.

A portion of the product water formed by condensation and melting permeates the ice bed to wash the ice and is extracted from the washer-melter means through brine drainage screens with the brine. This washing action causes displacement of brine from the ice crystals. The rate of washing of the ice is controlled preferably by back pressure on the drainage screens.

A minor portion of the vapor evolved in the freezer means is removed therefrom and bypassed to absorber-regenerator means where it is absorbed by absorbent material contained in the absorber means. The vapor pressure of the absorbent material is maintained below that of the bypassed vapor by control of the temperature and concentration of the absorbent material in order to assure absorption of the vapor in the absorbent material.

The diluted absorbent material mixture, e.g., the absorbent material having the bypassed vapor absorbed therein, is then pumped from the absorber means through a heat exchanger wherein the mixture is heated by the return flow of concentrated absorbent material, e.g., the absorbent material divested of the absorbed bypassed vapor, from regenerator means and is introduced into the regenerator means to produce vapor which is at a higher temperature and pressure than in the vapor produced in the freezer means. In the regenerator means, dilute absorbent material mixture is heated to a temperature sufficient to boil off the absorbed vapor at a higher temperature and pressure than the vapor in the freezing means, contained in the mixture. A minor portion of the boiled off vapor is transported to condenser means wherein product sweet water is produced. The quantity of boiled off vapor to be condensed in the condenser means 14 is determined by the heat unbalance in the system. Ideally at the freezing point approximately 7½ lbs. of ice are formed for each pound of vapor produced in the freezer. However, because of heat leakage into the system, not all of the 7½ lbs. of ice per pound of vapor is delivered to the melter because of prior melting due to heat leakage. Consequently there would be an excess of vapor in the melter unless part of the vapor is condensed by other means. Accordingly, the quantity of vapor condensed in the condenser — is preferably that quantity which will compensate for this system heat unbalance.

The remaining portion of the boiled off vapor is cycled to the ejector means, where because of its higher temperature and pressure, the boiled off vapor raises the temperature and pressure of the major portion of the vapor directed from the freezer means wherefrom the vapor is delivered to the melter portion of the washer-melter means at the required rate to assure efficient condensing of vapor and melting of ice.

DETAILED DESCRIPTION OF INVENTION

Figure 1:
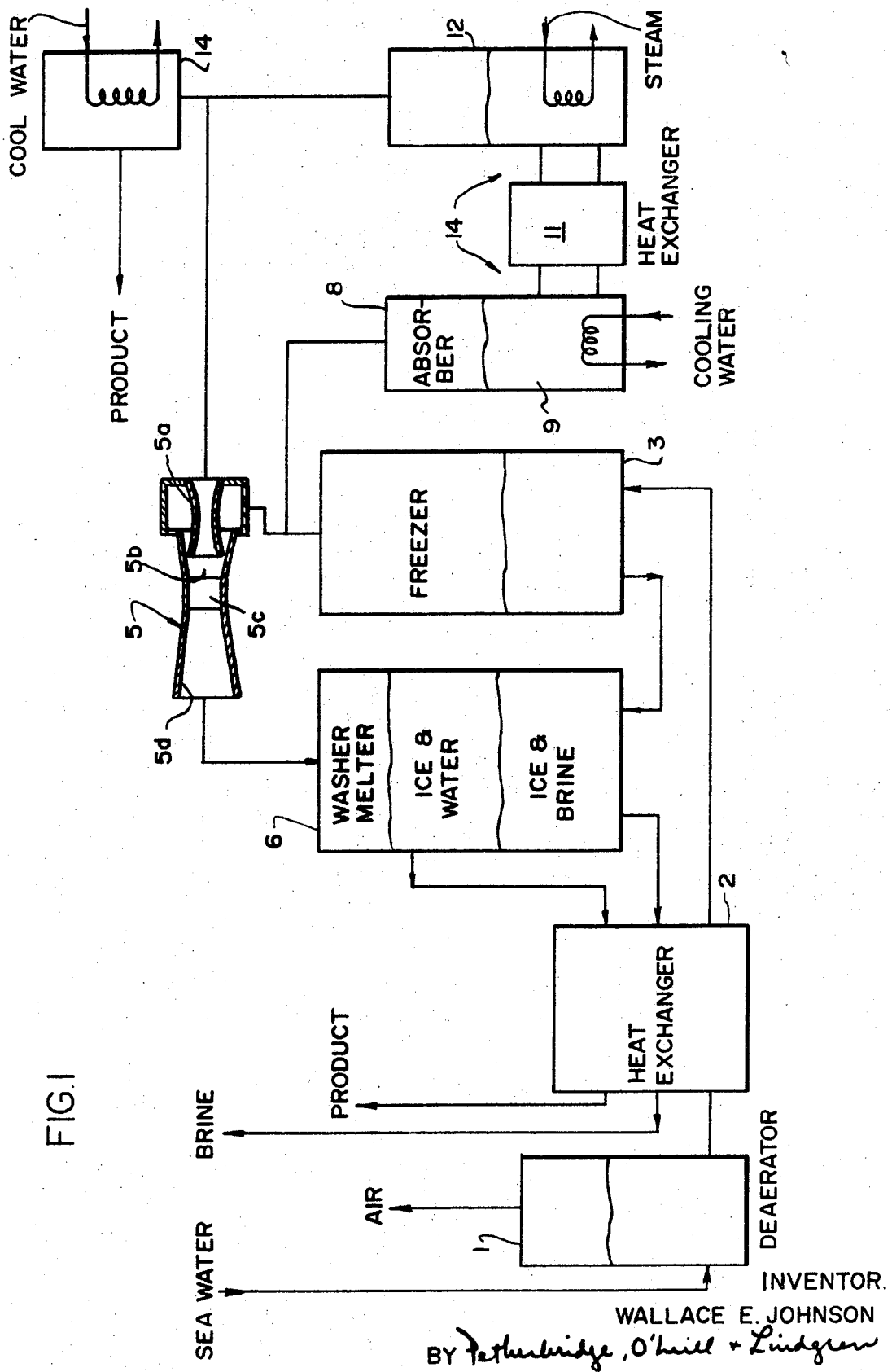

Referring now to the drawing illustrating a vacuum freezing desalination system, sea water enters the system through deaerator means 1, wherein dissolved air is removed from the sea water. The sea water is then transported through heat exchange means 2, wherein the temperature of the sea water is substantially reduced to approach the triple point of sea water. Assuming the temperature of sea water is approximately 60° F. when entering the system, the heat exchange means 2, functions to reduce the temperature thereof to a level of about 33° F. The cooling effect obtained in the heat exchange means 2 is the result of a three-fluid heat exchange effect wherein the incoming sea water is cooled by counter-current flow with respect to a brine solution and product water leaving the system, as will be more fully explained hereinafter.

The heat exchange means 2 is disposed through conduit means, in fluid communication with freezer means 3 which in this example is vacuum freezing means, whereby the sea water is transported from the heat exchange means 2, to the freezer means 3. Part of the sea water is flash evaporated in the freezer means 3, resulting in the formation of an ice-brine slurry and water vapor. Evaporation of the water to form water vapor in the system illustrated in the drawing is obtained by maintaining the freezer means 3 under vacuum conditions. The vacuum conditions are obtained by means of ejector means 5 which is disposed through conduit means in fluid communication with the freezer means 3. The major portion of the water vapor evolved in the freezer means 3, is removed from the freezer means 3, by the ejector means 5, and compressed therein, and then the compressed vapor is delivered to a vapor space 6, of washer-melter means 7, for purposes to be more fully described hereinafter.

Simultaneously, the concentrated ice-brine slurry mixture disposed adjacent the lower end of the freezer means 3 is continuously withdrawn and transported, such as by gravity feed or by any other suitable manner, to washer-melter means 7, to form a piston bed ice column therein.

In summary, the freezer means 3, is provided with an inlet to permit the entrance of sea water therein, and an outlet adjacent the lower end of the freezer means 3, to permit the exiting of the ice-brine slurry therefrom and into the washer-melter means 7, as well as outlet means to permit the withdrawal of the water vapor therefrom.

In general, the ejector means 5, compresses water vapor obtained from freezer means 3, to a higher pressure as required for melting washed ice crystals in the melter portion of the washer-melter means 7, and condensing of the vapor. Hence, a pressure differential between the freezer means 3, and the washer-melter means 7, is maintained by the ejector means 5, the vacuum conditions in the freezer means 3, being a function of the overall pressure allowably maintained in the freezer-washer-melter system. The details of construction of ejector means 5, found useful in the practice of the present invention are well within the knowledge of those skilled in the art. In general, the ejector means 5, includes a convergent-divergent high pressure nozzle 5a, mixing section 5(b), throat 5(c) and diffuser 5(d).

The ejector means 5, is provided in lieu of a mechanical compressor and functions to transport large quantities or volumes of water vapor from the freezer means without the need for large mechanical compressor equipment.

The portion of the water vapor which is not moved and compressed by the ejector means 5, is transported by conduit means to absorption regenerator means, 4.

The absorption means 4 described herein has as a main purpose to bypass a portion of the water vapor produced in the freezer means 3, and to increase the temperature and pressure of the bypassed water vapor for operation of the ejector means 5, to move the major portion of the water vapor from the freezer means 2, compresses it and delivers the compressed vapor to the melter portion of the washer-melter means 7. Thus, a portion of the water vapor which is produced in the freezer means 3, is transported via conduit means to an absorption unit 8 of the absorption-regenerator means 4, in which is disposed an absorbent material indicated by the numeral 9. The absorbent material 9 may consist of any solution or substance which will absorb the vapor, and to this end, it has been found that a solution of sodium hydroxide is particularly suitable for absorbing water vapor. It is known that to absorb 1.0 pounds of water vapor at 25° F. and 3.0mm HG, 24 pounds of a 49 percent sodium hydroxide solution is needed. The temperature of the absorbent material 9 is maintained relatively constant by means of a cooling unit 10, in heat exchange with the unit 8, through which cooling water is circulated.

The mixture of absorbent material 9, having the water vapor absorbed therein is then passed through a heat exchanger 11, which is disposed in fluid communication with a regenerator 12, to which the mixture of the absorbent material having the water vapor absorbed therein is transported. The heat exchanger 11, raises the temperature of the mixture flowing to the regenerator to approach the temperature of the regenerator 12, by heat exchange between the mixture and hot concentrated regenerated absorbent material flowing from the regenerator unit 12, of the absorption-regenerator means 4, through the heat exchanger 11 to the absorber unit 8, for re-use in the unit 8.

As aforesaid, the regenerator 12, functions to boil off water vapor which is at a higher temperature and pressure than the vapors in the freezer means 3. The major portion of the boiled off vapor is transported via conduit means to the ejector means 5, to provide the motive energy force for driving same. In this manner, the energy source for the ejector means 5, is internal with respect to the system, and not external as is usually found in other prior art systems. As has been described, the ejector means 5 moves the vapor from the freezer means 3, and deposits the vapor in the vapor space of the washer-melter means adjacent the top of the piston ice column therein. The compressed vapor condenses upon and melts the ice crystals to effect separation of the sweet water from the brine, in the case of a desalination system. In addition, the compressed vapor serves the additional function of washing the ice crystals in order to remove the brine from the surface of the ice crystals. Hence, there is a combined function of melting ice crystals while at the same time washing the same in order to produce a relatively pure sweet water product.

The remaining portion of boiled off water vapor from the regenerator 12 is transported via conduit means to a condenser unit 14, which is provided with cooling means 15 for condensing the boiled off water vapor which enters the condenser 14 to form product sweet water which is then removed from the system.

The product sweet water is withdrawn from the washer-melter means 7, through an outlet and is transported through the heat exchanger 2, via conduit means. The brine solution which has been washed from the ice crystals gravitates or is moved toward the bottom of the washer-melter means 7 and is withdrawn through an outlet for transport through the heat exchanger 2, via separate conduit means. Both the product sweet water and the brine solution are at lower temperatures when passing through the heat exchanger 2, than the deaerated sea water which is entering the heat exchanger 2 thereby to maintain a temperature differential in the heat exchanger 2 for cooling the sea water as it enters the system. The product sweet water is removed from the heat exchanger 2, via separate conduit means and the brine solution is similarly removed from the heat exchanger 2, via separate conduit means, and may be used for such purposes as may be desired.

The advantages of the present invention utilizing an ejector means over mechanical compressors is evident, in simplicity, reliability and size. The advantages of the present invention utilizing ejector absorption means wherein a portion of the water vapor produced in the freezer is utilized as the driving force for the ejector means over such a system wherein the driving force is supplied outside the system is not quite as evident. The major advantage of the present invention is a substantial power saving in that no energy requirements exist for removal of the ejector driving force materials from the system. Ancillary advantages of the present invention are (1) that once the ejector driving force material has completed its driving function, it then becomes a part of the system end product, and (2) the driving material assists in maintaining the system heat balance.

Figure 2:
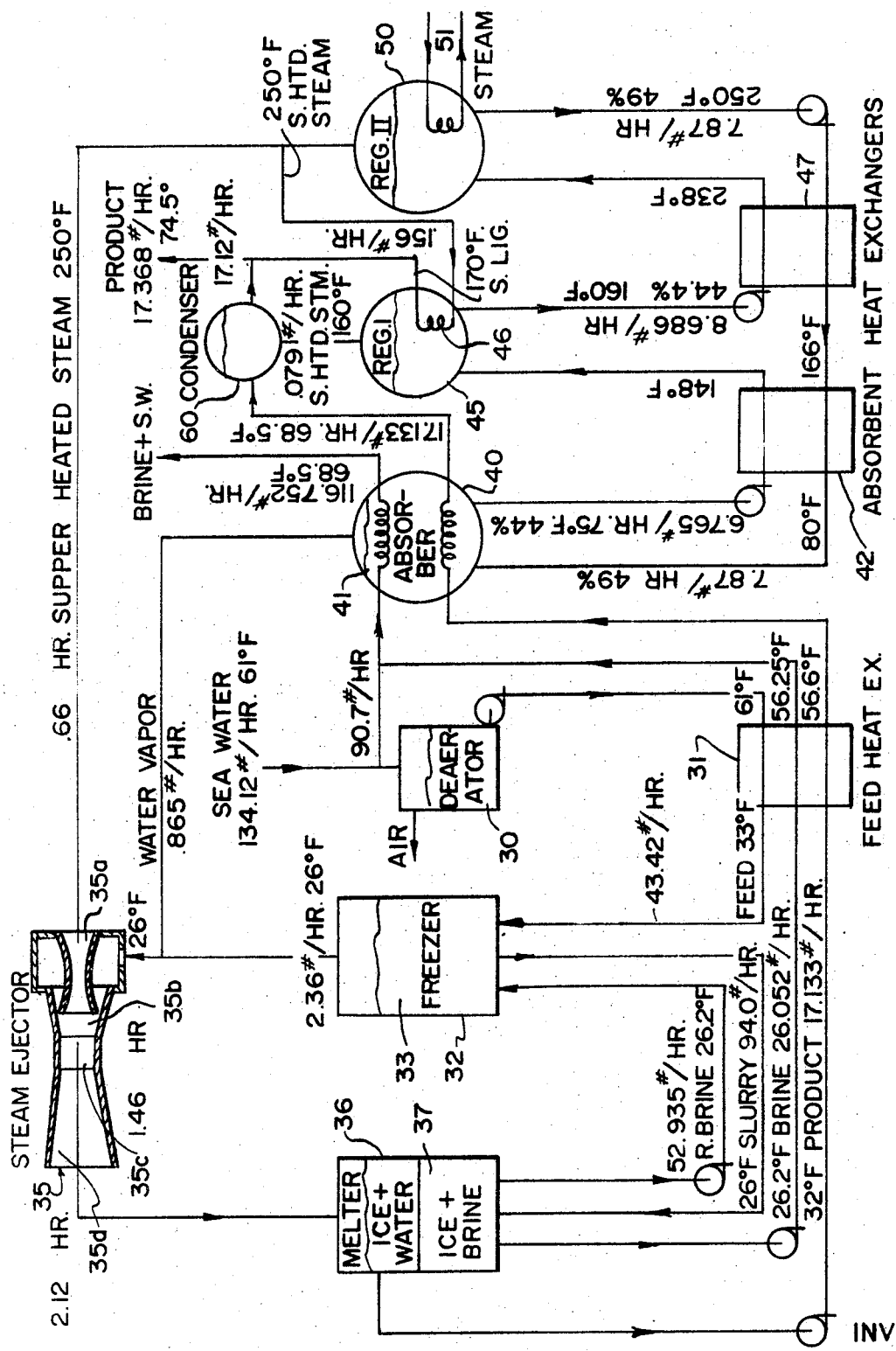

FIG. 2 is a schematic of a specific example of a desalination system employing the novel features of the present invention.

Sea water enters the system through the deaerator 30, wherein substantially all of the dissolved air is removed. The system as illustrated in FIG. 2 is equipped to handle 134.12 million pounds of sea water per hour (hereinafter abbreviated "mp/h").

From the deaerator 30, the sea water is transported via conduit means e.g., pipes or the like, to a feed heat exchanger 31. The sea water is normally at a temperature of approximately 61° F. and the function of the heat exchanger 31, is to cool the temperature of the sea water by approximately 50 percent or to a temperature of approximately 33° F. The temperature differential in the heat exchanger 31 is maintained by the return flow of product sweet water and brine solution. Approximately 17.133 mp/h of product sweet water enters the heat exchanger 31, at an initial temperature of 32° F. and exists at a temperature of 56.6° F., while 26.052 mp/h of brine solution enters the heat exchanger 31 at an initial temperature of 26.2° F. and exists at a temperature of 56.25° F., thereby to produce the cooling of the sea water from 61° F. down to 33° F., as will be more fully described hereinafter.

The sea water is then fed into the freezer apparatus 32, through an inlet (not shown) at the rate of about 43.42 mp/h. The freezer 32 is maintained under vacuum conditions by a steam ejector 35 which operates in a manner to be more fully described hereinafter. Due to the vacuum conditions maintained in the freezer 32, flash evaporation occurs thereby to produce water vapor and an ice-brine slurry 33, within the freezer 32. The steam ejector 35 is in fluid communication with the freezer 32 and operates to withdraw the water vapor therefrom at the rate of about 2.36 mp/h which is cooled to a temperature of 26° F. Of the 2.36 mp/h of water vapor drawn off from the freezer 32, 1.46 mp/h is taken up by the steam ejector 35, compressed and transported to a washer-melter apparatus 36, the details of which are described hereinbelow.

The remaining 0.895 mp/h of water vapor is transported to an absorber unit 40, for a purpose to be described more fully hereinafter.

The ice-brine slurry 33 in the freezer 32 is withdrawn therefrom through an outlet (not shown) at the rate of about 94.0 mp/h and is transported to the washer-melter 36 wherein a piston ice column (designated as 37) is formed. The compressed water vapor from the steam ejector 35, is transported and delivered to the vapor space of the washer-melter adjacent the top of the ice column 37 at the rate of 2.12 mp/h of water vapor. The water vapor melts the ice crystals in the ice column while at the same time washing the brine from the surface of the ice. The washer-melter 36 is provided with a first outlet (not shown) through which product sweet water is withdrawn as the ice is melted and washed. As was indicated previously, the product sweet water is withdrawn from the washer-melter 36 at approximately 17.133 mp/h and has a temperature of 32° F. The washer-melter 36 is also provided with a second outlet through which the brine solution is withdrawn at the rate of about 26.052 mp/h and at a temperature of about 26.2° F.

Both the product sweet water and the brine solution are channelled through the feed heat exchanger 31 in order to provide the temperature differential therein for cooling the sea water entering the system, as was described previously.

In the system illustrated in FIG. 2, a slight modification is shown in that the product sweet water from the washer-melter 36 is not withdrawn from the system following passage through the feed heat exchanger 31. In this embodiment, the product sweet water is transported via conduit means to the absorber unit 40 and similarly, the brine solution is transported via separate conduit means to the absorber unit 40 in order to provide cooling for the absorber unit 40 in a manner to be more fully described hereinafter.

The absorber unit 40 contains a solution of absorbent material 41, in this case a 49 percent solution of sodium hydroxide. The absorbent material 41 absorbs the 0.895 mp/h portion of water vapor drawn off from the freezer 32 by the steam ejector 35 in such manner as was previously described. The absorbent material 41 having the absorbed water vapor therein is then pumped through a first absorbent heat exchanger 42 at the rate of 6.765 mp/h of absorbent material 41 plus absorbed water vapor, having an initial temperature of 75° F., and the temperature of this solution is raised to 148° F. after passage through this first absorbent heat exchanger 42.

From the heat exchanger 42, the absorbent material 41 having the absorbed water vapor therein is pumped to a first regenerator 45 which is provided with a heating element 46. The temperature of the solution is raised therein to around 160° F. thereby to boil off the absorbed water vapor in the form of superheated steam at the rate of 0.079 mp/h of superheated steam. The evolved steam is then transported to a condenser unit 60 wherein it is condensed to form product sweet water.

The heated absorbent material remaining in the first regenerator 45 is then pumped therefrom at the rate of 8.636 mp/h to a second absorbent heat exchanger 47 wherein the temperature of the solution is elevated from the entry temperature of 160° F. to an exit temperature of about 238° F. The solution is then transported to a second regenerator 50 provided with a heating element 51 wherein the temperature of the solution is raised still higher to about 250° F. thereby boiling off the remaining portions of absorbed water vapor from the absorbent material 41 in the form of superheated steam. The material portion of the superheated steam formed in the second regenerator 50 is transported via conduit means to the steam ejector 35 at the rate of 0.66 mp/h thereby to provide the motive force therefor. The remaining portion of the steam is transported to the heating element 46 in the first regenerator 45 to provide the heat source for the first regenerator 45, and from there, the steam is condensed and transported to the discharge end of condenser 60 and combined with the product sweet water derived from other sources.

Hence, product sweet water is derived from three different sources within the system: (1) product sweet water derived from the washer-melter 36 and pumped through heat exchanger 31, absorber 40 and condenser 60; (2) superheated steam derived from the first regenerator 45 and pumped to the condenser 60; and (3) superheated steam derived from the second regenerator 50 and condensed in heating element 46 in the first regenerator 45. As shown in this example, product sweet water is produced at the rate of 17.368 mp/h from a total input of 134.12 mp/h of sea water.

The heated absorbent material 41 remaining in the second regenerator 50 after the absorbed water vapor has been driven off is pumped back through the second and first absorbent heat exchangers 47 and 42 respectively, thereby to provide the necessary temperature differential for heating the absorbent material 41 containing absorbed water vapor therein and flowing in the reverse direction therethrough, and finally is returned to the absorber unit 40 in order to complete the cycle. The absorbent material 41 is returned to the absorber unit 40 at the rate of 7.87 mp/h, and is once again at the higher concentration as is necessary to absorb additional portions of water vapor. It will be observed that as water vapor is absorbed by the absorbent material 41, the concentration of the sodium hydroxide solution, for example, is reduced to as low as 44 percent from the original 49 percent solution. As the absorbent material 41 passes through the various regenerators, 45 and 50 respectively, and water vapor is boiled off, the concentration increases until it is once again at the 49 percent level when returned to the absorber unit 40.

The temperature of the returning absorbent material 41 is approximately 80° F., and in order to cool the solution to a lower temperature, the return flow of product sweet water and brine solution from the washer-melter unit 36 is employed, as previously described. Both the product sweet water and the brine solution are at a lower temperature than the returning absorbent material 41, and hence, by passing these solutions through the absorber unit 40 the absorbent material 41 is cooled to a temperature of about 75° F. while the product sweet water and brine solution are each heated slightly to temperatures of 63.5° F.

The steam ejector 35 is of the type as previously described and includes a convergent-divergent high pressure nozzle 35a, a mixing section 35b, a throat section 35c, and a diffuser 35d.

A principal advantage this system described hereinabove is that the system may be operated on a continuous basis, and, the system may be applied to large scale operations without the need of greatly increasing the size of the equipment. Furthermore, the efficiency of the system is of a greater order than systems heretofore developed in the prior art. The system may be modified by changing the absorber loop to include two regenerators and two heat exchangers. For example, the absorbent material having the water vapor absorbed therein may be withdrawn therefrom and transported through a first heat exchanger wherein it would be heated to a desired temperature for example, of 150° F. The solution may then be introduced into first regenerator means wherein approximately 8 to 10 percent of the absorbed water vapor is boiled off by the first regenerator. Mathematically, by raising the temperature by approximately 10 to 15 degrees in the first regenerator means, approximately 8–10 percent of the absorbed water vapor would be boiled off assuming that the water vapor saturation pressure is maintained at about 45 mm Hg. The remaining absorbent material from which the water vapor is boiled off has now been concentrated in view of the fact that approximately 8–10 percent of the water has been boiled off in the first regenerator means. This more concentrated absorbent material solution is then pumped through a second heat exchanger wherein it is further heated by hot sodium hydroxide solution. The solution would be heated in the second heat exchanger to a temperature in excess of 230° F. and be introduced into second regenerator means wherein the temperature would be increased by another 10°–15° F. In addition, the pressure of the second regenerator means is elevated to a range of about 300 mm Hg., thereby causing the remaining water vapor absorbed to be boiled off from the concentrated absorbent material solution. The steam derived from the second regenerator means is then transported to the steam ejector means wherein it is utilized in order to provide the motive force therefor. Alternatively, a portion of the superheated water vapor derived from the second regenerator means may be cycled back to the first regenerator means, as the heat source therefor, while the remainder of the superheated water vapor is then supplied to the steam ejector means to provide the motive force therefor. In this instance, the steam which is cycled to the first regenerator means, as well as that which is evolved in the first generator means, represents the excess vapor evolved in the freezer over that required for stoichiometric balance in the washer-melter. This is the water vapor generated in the freezer means, etc.

It is to be understood that the system as described herein can be operated over a wide range of performance ratios, i.e., less than those indicated above or higher than those values indicated herein, dependent upon the amount of heat transfer surface which is expended in the absorber loop, the process yield, the degree to which staging in the freezer is employed, and the steam temperature. Lower, as well as higher, steam temperatures may be accommodated in this system. It is also possible to use a different absorbent material in order to change the operating characteristics of the system and the process.

While there has been described what is at present considered to be a preferred embodiment of the invention, it will be understood that various modifications may be made therein, and it is intended to cover the appended claims, all such modifications as fall within the true spirit and scope of the invention defined therein.

What we claim is:

1. In a system for separating a solvent in substantially pure form from a solution including freezer means for producing solvent vapors and a slurry of frozen solvent and liquid solute and means for separating the frozen solvent and liquid solute, the improvement comprising, ejector means in fluid communication with the freezer means for moving the major portion of the solvent vapor from the freezer means and for compressing the vapor, means in communication with said ejector means for receiving and condensing said compressed vapor, bypass absorber and regenerator means for increasing the temperature and pressure of the remaining portion of the solvent vapor produced in the freezer means and, means for communicating the absorber and regenerator means with said ejector means for flowing the remaining portion of the solvent vapors to the ejector means to drive the ejector means.

2. The system of claim 1, including means for moving said slurry to said separating means.

3. The system of claim 2 including means for washing said frozen solvent.

4. The system of claim 3, including means for moving separated and washer frozen solvent from said separating means to said condensing means for heat exchange with said compressed vapor to condense said vapor and to melt said frozen solvent.

5. The system of claim 4, wherein said absorber and regenerator means includes solvent vapor absorption means, means in communication with said absorption means for heating absorbed solvent vapor, means in communication with said heating means for separating said superheated vapor for the absorption material and means for moving separated superheated vapor from said separating means to said ejector means for providing the driving force for said ejector means to move said major portion of said vapor from said freezer means.

6. In a solution separation system having a vacuum freezer for freezing a quantity of solution therein, thereby to form an ice slurry and solvent vapors therein, and a washer-melter apparatus for receiving the ice slurry from the freezer thereby to form an ice column in the washer-melter, the improvement comprising in a combination a steam ejector in fluid communication with said freezer for withdrawing the solvent vapors therefrom and transporting said vapors to the washer-melter, and an absorber loop in fluid communication with said freezer, said absorber loop including absorber means for absorbing solvent vapors therein, and regenerator means for removing the absorbed vapors from said absorber means to create steam, and means to transport the steam to said steam ejector thereby to provide the motive force for driving said steam ejector, and said steam ejector transporting said steam to the washer-melter apparatus to deposit the steam on the ice contained therein, thereby to melt the ice crystals to form product solvent.

7. A vacuum-freezing ejector absorption solution separating system comprising, a freezer apparatus having inlet means, a steam ejector in fluid communication with said freezer apparatus, a washer-melter apparatus, in fluid communication with said freezer apparatus adjacent one end thereof and in fluid communication with said steam ejector adjacent the other end thereof, and absorber means in fluid communication with said freezer apparatus, whereby a solution to be separated into a solvent and a solute is introduced into said freezer apparatus through said inlet means wherein said solvent is partially vaporized while an ice slurry is formed, a portion of the vapors being drawn from said freezer apparatus by said steam ejector while the ice slurry formed in said freezer apparatus is delivered to said washer-melter apparatus, while the remaining portions of the vapors formed in said freezer apparatus are delivered to said absorber means wherein vapors are regenerated partially to provide a motive fluid for said steam ejector means for transporting said motive fluid to said steam ejector while the remaining vapors are formed into the product solvent, the steam from said steam ejector being delivered to the other end of said washer-melter apparatus to melt the ice crystals present therein to form additional portions of product solvent.

8. The vacuum-freezing ejector absorption solution separating system as set forth in claim 7, wherein said freezer is maintained under substantially vacuum conditions.

9. The vacuum-freezing ejector absorption solution separating system as set forth in claim 7, wherein said washer-melter apparatus is maintained at a higher pressure than said freezer apparatus and said freezer differential is maintained by means of said steam ejector.

10. The vacuum-freezing ejector absorption solution separating system as set forth in claim 7, wherein said absorber means includes first means containing an absorbent material therein for absorbing the solvent contained in the vapors transported to said absorber means from said freezer apparatus, and a second means provided with a heating element for heating and vaporizing the absorbed solvent.

11. The vacuum-freezing ejector absorption solution separating system as set forth in claim 10, wherein said absorbent material comprises a sodium hydroxide solution.

12. The vacuum-freezing ejector absorption solution separating system as set forth in claim 10 wherein said second means comprises a regenerator and said heating element comprises a coiled tube through which steam is passed to produce the heating effect.

13. The vacuum-freezing ejector absorption solution separating system as set forth in claim 12 which further includes a condenser in fluid communication with said regenerator.

14. The vacuum-freezing ejector absorption solution separating system as set forth in claim 13, wherein a substantial portion of the vapors produced by said regenerator are transported to said steam ejector thereby to provide a driving force therefor, and the remaining portions of said vapors being transported to said condenser wherein said vapors are condensed to form product solvent.

15. A vacuum freezing ejector-absorption solution separating system comprising a freezer apparatus maintained under vacuum conditions for forming an ice slurry therein, inlet means for permitting the entrance of solution into said freezer apparatus, a steam ejector in fluid communication with said freezer apparatus for maintaining the vacuum conditions therein, absorber means containing an absorbent material and in fluid communication with said freezer apparatus, a washer-melter apparatus in fluid communication at its one end with said freezer apparatus for receiving the ice-brine slurry from said freezer apparatus and wherein an ice column is formed, and in fluid communication at its other end with said steam ejector for receiving the steam generated thereby, said steam ejector receiving additional portions of water vapor from said freezer apparatus for generating steam and being in fluid communication with said washer-melter apparatus whereby steam is delivered to said washer-melter apparatus for melting the ice crystals contained therein to form produce solvent which is drawn off from said washer-melter apparatus, a regenerator in fluid communication with said absorber means for regenerating the vapors absorbed by the absorbent material in said absorber means, a condenser in fluid communication with said regenerator, the substantial portion of the regenerated vapors being in fluid communication with to said steam ejector for aiding in the generation of steam therein, and the remaining portion of the regenerated vapors being delivered to said condenser to form additional portions of product solvent, whereby solution entering the system through said inlet means is delivered to said freezer apparatus wherein portions of the solution are frozen to form an ice slurry which is then delivered to said washer-melter apparatus to form an ice column, while some portions of the vapors are drawn off from said freezer apparatus and delivered to said steam ejector to generate steam which, in turn, maintains the vacuum conditions in said freezer apparatus, while other portions of the vapors, from said freezer apparatus are delivered to said absorber means and absorbed in an absorbent material and then delivered to said regenerator wherein the absorbed vapors are regenerated under heat, some portions of which are condensed to form solvent while other portions of the vapors are in fluid communication with to said steam ejector to aid generation of steam, and the steam generated by said steam ejector being delivered to said washer-melter apparatus thereby to melt the ice formed therein which may then be drawn off in the form of product solvent while the solute is continuously drained out.

16. A method for separating a solution into a solvent and a solute comprising freezing said solution in a freezer apparatus maintained under substantially vacuum conditions thereby to form an ice slurry and solvent vapors, withdrawing and compressing a portion of the solvent vapors by means of a steam ejector apparatus, withdrawing and transporting the remaining portions of the solvent vapors to an absorber apparatus having an absorbent material contained therein, absorbing the vapors in the absorbent material, regenerating the vapors by means of a regenerator apparatus, transporting a portion of the regenerated vapors to the steam ejector apparatus thereby to provide a motive force therefor, condensing the remaining portions of the vapors to form product solvent, withdrawing said ice slurry from the freezer apparatus and transporting said ice slurry to a washer-melter apparatus thereby to form an ice column therein, and delivering steam from said steam ejector into said washer-melter apparatus thereby to melt the ice crystals and withdrawing said melted ice crystals to form additional portions of product solvent.

17. The method as set forth in claim 17, wherein said washer-melter is maintained at a higher pressure than said freezer apparatus by means of a steam ejector.

18. The method as set forth in claim 17, wherein said absorbent material comprises a solution of sodium hydroxide.

19. The method as set forth in claim 17, wherein the vapors are regenerated from the absorbent material by means of heat applied in said regenerator apparatus.

20. A method for desalination of sea water comprising introducing salinated water into a freezer apparatus, freezing the salinated water in said freezer apparatus thereby to form an ice-brine slurry and water vapors within said freezer apparatus, withdrawing a portion of the water vapor contained within said freezer apparatus and compressing the water vapor by means of a steam ejector, withdrawing the remaining portions of the water vapors contained within said freezer apparatus and introducing the water vapor to absorber means, absorbing the water vapor in an absorbent material contained within said absorber means, regenerating the absorbed water vapor by means of a regenerator apparatus, transporting a substantial portion of the regenerated water vapor to said steam ejector to provide the motive force therefor, transporting the remaining portions of the regenerated water vapor to a condenser, condensing the water vapor in said condenser to form product, sweet water, withdrawing the ice-brine slurry from said freezer apparatus and transporting same to said washer-melter apparatus thereby to form an ice column in said apparatus, delivering steam from said steam ejector to said ice column thereby to melt the ice crystals therein, withdrawing the melted ice from said washer-melter apparatus thereby to form product, sweet water, and withdrawing the remaining brine slurry from said washer-melter apparatus.

* * * * *